US012500047B2

(12) United States Patent
Kellendorfer

(10) Patent No.: US 12,500,047 B2
(45) Date of Patent: Dec. 16, 2025

(54) SWITCH UNIT

(71) Applicant: MASCHINENFABRIK REINHAUSEN GMBH, Regensburg (DE)

(72) Inventor: Georg Kellendorfer, Lappersdorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 202 days.

(21) Appl. No.: 18/571,750

(22) PCT Filed: Jun. 7, 2022

(86) PCT No.: PCT/EP2022/065371

§ 371 (c)(1),
(2) Date: Dec. 19, 2023

(87) PCT Pub. No.: WO2022/268489

PCT Pub. Date: Dec. 29, 2022

(65) Prior Publication Data

US 2024/0290556 A1 Aug. 29, 2024

(30) Foreign Application Priority Data

Jun. 25, 2021 (DE) ..................... 10 2021 116 421.4

(51) Int. Cl.
*H01H 9/00* (2006.01)
*H01H 3/26* (2006.01)

(52) U.S. Cl.
CPC ............ *H01H 9/0027* (2013.01); *H01H 3/26* (2013.01); *H01H 9/0038* (2013.01); *H01H 2003/266* (2013.01)

(58) Field of Classification Search
CPC ...... H01H 9/0027; H01H 3/26; H01H 9/0038; H01H 2003/266; H01H 2009/0061
See application file for complete search history.

(56) References Cited

U.S. PATENT DOCUMENTS

| | | | | |
|---|---|---|---|---|
| 2006/0244431 | A1 | 11/2006 | Dohnal et al. | |
| 2015/0171783 | A1 | 6/2015 | Kammerl et al. | |
| 2019/0066940 | A1 | 2/2019 | Meyer et al. | |
| 2019/0096596 | A1 * | 3/2019 | Hammer | H01H 9/0027 |

(Continued)

FOREIGN PATENT DOCUMENTS

| | | | |
|---|---|---|---|
| DE | 202010011522 | U1 | 11/2011 |
| DE | 102013107577 | A1 | 2/2014 |

(Continued)

*Primary Examiner* — Adolf D Berhane
*Assistant Examiner* — Afework S Demisse
(74) *Attorney, Agent, or Firm* — LEYDIG, VOIT & MAYER, LTD.

(57) ABSTRACT

A switch unit for switching over an onload tap changer. The switch unit has an on-load tap changer with an actuating shaft that actuates a switch; and a drive system with a motor. The drive system is mechanically coupled to and configured to actuate the on-load tap changer. The drive system is configured such that, when the on-load tap changer is actuated, the drive system uses the actuating shaft as a store for kinetic energy in such a way that the actuating shaft is accelerated and the switch is actuated by the kinetic energy from the actuating shaft and additional energy provided by the motor.

7 Claims, 6 Drawing Sheets

(56) References Cited

U.S. PATENT DOCUMENTS

| | | | | |
|---|---|---|---|---|
| 2022/0208482 | A1 | 6/2022 | Schmid et al. | |
| 2022/0262581 | A1 | 8/2022 | Schmid et al. | |
| 2022/0406534 | A1 * | 12/2022 | Schuster .............. | H01H 9/0011 |
| 2023/0317382 | A1 * | 10/2023 | Unterreiner .......... | H01H 9/0044<br>200/52 R |

FOREIGN PATENT DOCUMENTS

| | | | |
|---|---|---|---|
| DE | 102016104500 | B3 | 5/2017 |
| DE | 102019112720 | A1 | 11/2020 |
| WO | WO 2004088693 | A1 | 10/2004 |
| WO | WO 2013185961 | A1 | 12/2013 |
| WO | WO 2020229122 | A1 | 11/2020 |

* cited by examiner

SWITCH UNIT

CROSS REFERENCE TO RELATED APPLICATIONS

This application is a U.S. National Phase application under 35 U.S.C. § 371 of International Application No. PCT/EP2022/065371, filed on Jun. 7, 2022, and claims benefit to German Patent Application No. DE 10 2021 116 421.4, filed on Jun. 25, 2021. The International Application was published in German on Dec. 29, 2022 as WO 2022/268489 A1 under PCT Article 21(2).

FIELD

The present disclosure relates to a switch unit having an on-load tap changer and having a drive unit, and to a method for carrying out a switchover by means of the switch unit.

BACKGROUND

On-load tap-changers usually have a diverter switch and a selector. The actuation of the on-load tap changer is usually realized by means of a motor-drive unit in conjunction with a spring energy store. When a switchover is carried out, the motor-drive unit prestresses the springs of the spring energy store. In this case, either compression springs are compressed or tension springs are extended. From a defined mechanical point, the energy introduced into the springs is abruptly released and the on-load tap changer is actuated. For this type of actuation, there is no possibility for the energy required for the switchover, at least from the point in time at which the spring energy is released, to be controlled.

SUMMARY

In an embodiment, the present disclosure provides a switch unit for switching over an onload tap changer. The switch unit has an on-load tap changer with an actuating shaft that actuates a switch; and a drive system with a motor. The drive system is mechanically coupled to and configured to actuate the on-load tap changer. The drive system is configured such that, when the on-load tap changer is actuated, the drive system uses the actuating shaft as a store for kinetic energy in such a way that the actuating shaft is accelerated and the switch is actuated by the kinetic energy from the actuating shaft and additional energy provided by the motor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
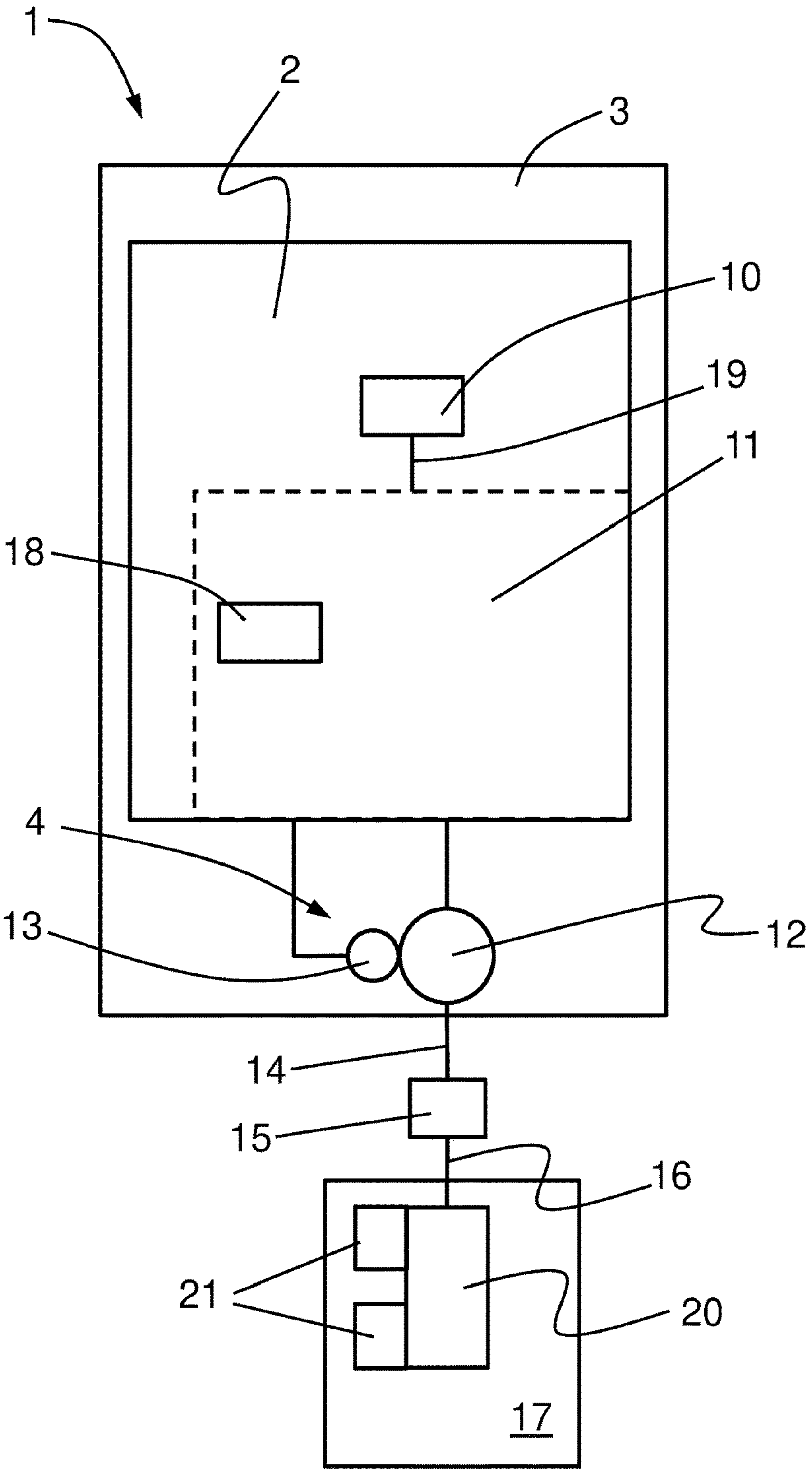
FIG. 1 shows a schematic illustration of the switch unit.

Aspects of the present disclosure provide a switch unit without a spring energy store that intelligently uses the energy required for the switchover and, at the same time, is of simple and compact construction.

Further aspects of the present disclosure provide a method for carrying out a switchover by means of the switch unit that is able to be carried out reliably and efficiently.

According to a first aspect, the present disclosure proposes a switching unit comprising:

- an on-load tap changer with an actuating shaft which actuates a switching means,
- a drive system with a motor;
- wherein:
  - the drive system is mechanically coupled to and actuates the on-load tap changer;
  - the drive system, when the on-load tap changer is actuated, uses the actuating shaft as a store for kinetic energy in such a way that the actuating shaft is accelerated and the switching means is actuated by means of kinetic energy from the actuating shaft and further energy provided by the motor.

The switch unit according to the present disclosure makes it possible for the switching means to be actuated particularly efficiently and thus for a switchover of the on-load tap changer to be carried out. The actuating shaft is initially accelerated and absorbs kinetic energy. During this phase, although the actuating shaft is mechanically connected to the switching means, it does not actuate them yet. The switching means are actuated only from a point, which is defined by the construction. Here, the kinetic energy of the actuating shaft and the energy from the motor of the drive system are then used to actuate the switching means and thus to carry out a switchover of the on-load tap changer. The mass of the actuating shaft and the motor of the drive system are optimally matched to the switching means. Consequently, when the switching means are actuated, a situation in which the rotational speed of the motor falls such that a minimum value of the rotational speed is fallen below is avoided. In this way, switching times are adhered to at all times. Transition resistors are not acted on by a circulating current for too long. Furthermore, use is made of a motor which is precisely adapted and which is not overdimensioned. The switch unit is thus economical. The momentum of the actuating shaft is used for optimally carrying out a diverter switch operation.

The switch unit may be of any desired design, wherein the actuating shaft and the switching means are mechanically coupled in such a way that the actuating shaft actuates the switching means after a fixed angle of rotation.

In this case, the actuating shaft may have on its outer surface cams which are distributed in a partially encircling manner. The switch unit may have multiple switching means which comprise vacuum interrupters and/or selector contacts. The switching means could comprise actuating levers which travel over the outer surface of the actuating shaft by means of rolls. During the rotation of the actuating shaft, the switching means are actuated only when the respective roll of an actuating lever meets a cam. When actuated, the vacuum interrupters are correspondingly closed and opened. The selector contacts contact the fixed contacts, which are connected to step taps of a tap winding.

The switch unit may be of any desired design, wherein the actuating shaft is revolved at least once, and the motor shaft is revolved multiple times, when the on-load tap changer is actuated.

When a switchover is being carried out, the motor shaft revolves multiple times according to the embodiment of a gear unit between the motor and the actuating shaft. During a switchover, the actuating shaft revolves at least once and at most three times, that is to say at least through 360 degrees or at most through 1080 degrees.

The switch unit may be of any desired design, wherein a torque for accelerating the actuating shaft is approximately or greater than a torque by which the switch means is/are actuated.

According to a second aspect, the present disclosure proposes a method for carrying out a switchover by means of a switch unit, wherein:

- in a first step, the actuating shaft is accelerated by the motor of the drive system, the actuating shaft absorbs kinetic energy in the process, and no switching means is actuated;
- in a second step, the switching means is actuated by means of the kinetic energy from the actuating shaft and an energy from the drive system;
- in a third step, the actuating shaft is decelerated by the motor of the drive system.

In carrying out a switchover by means of the switching unit, in particular in carrying out a switchover of the on-load tap changer or the actuation thereof, the switching process may be divided into multiple steps. In a first step, the actuating shaft is accelerated by the motor of the drive system. In the process, the actuating shaft stores kinetic energy. In a second step, the switching means are actuated. The energy required for this purpose is taken from the kinetic energy of the actuating shaft and further energy from the motor of the drive system.

FIG. 1 shows a schematic illustration of an exemplary embodiment of a switch unit 1 having an on-load tap changer 17 and having a drive system 3 which is connected via a drive shaft 16 to the on-load tap changer 17 and to its actuating shaft 20 and to the multiple switching means 21. This drive system 3 is used to carry out the method for carrying out a switchover of the on-load tap changer. The on-load tap changer 17 may comprise a diverter switch, selector, double reversing changeover selector, reversing changeover selector and/or changeover selector or else may be designed as a selector switch. The switching means 21 may be in the form of vacuum interrupters and/or simple contacts or selector contacts that are arranged in oil. The drive system 3 contains a motor 12 which can drive the drive shaft 16 via a motor shaft 14 and, optionally, via a gear unit 15. The drive shaft 16 is connected to the actuating shaft 20 in the on-load tap changer 17. A control device 2 of the drive system 3 comprises a power section 11 which contains for example a converter, for open-loop-controlled or closed-loop-controlled supply of energy to the motor 12, and a control unit 10 for controlling the power section 11, for example via a bus 19. The drive system 3 has a feedback system 4 which is functionally assigned to the drive shaft 16. The feedback system 4 may be an encoder system 13. It is also possible for the encoder system 13 to be a part of the feedback system 4. The feed back system 4 or the encoder system 13 is connected to the power section 11. Furthermore, the encoder system 13 is coupled directly or indirectly to the drive shaft 16.

The encoder system 13 is configured to detect a first value for a position, such as for example an angular position, in particular an absolute angular position, of the drive shaft 16 and thus also of the actuating shaft 20. For this purpose, the encoder system 13 may comprise for example an absolute-value encoder, in particular a multi-turn absolute-value encoder, or a single-turn rotary encoder, which is fastened to the drive shaft 16, the motor shaft 14 or some other shaft whose position is unambiguously linked to the position of the drive shaft 16. For example, the position of the drive shaft 16 or actuating shaft 20 is able to be determined unambiguously from the position of the motor shaft 14, such as for example via a transmission ratio of the gear unit 15. Furthermore, the encoder system 13 may comprise a virtual rotary encoder which determines the position of the motor shaft 14 and, from this, deduces the position of the drive shaft 16 or the actuating shaft 20.

The feedback system 4 is configured to detect a value for the position of the drive shaft 16 and thus also a position of the actuating shaft 20. In the case of an encoder system 13 designed as a multi-turn absolute-value encoder or a single-turn rotary encoder, the value for the position of the drive shaft 16 is made available as a protocol.

In the case of the encoder system 13 being designed as a virtual rotary encoder, the value for the position of the drive shaft 16 is ascertained from a rotor position of the motor 12. For this purpose, for example, an inductive feedback may be utilized by the movement of the rotor in motor windings of the motor 12. Since a strength of the feedback varies periodically, it is possible, in particular by means of signal analysis, such as for example by way of FFT analysis, for the rotor position to be determined approximately. Since one full revolution of the drive shaft 16 corresponds to a plurality of revolutions of the rotor, the position of the drive shaft 16 and also of the actuating shaft 20 can be deduced therefrom with much higher accuracy.

The encoder system 13 may also be designed as a combination of a virtual rotary encoder and an auxiliary contact which is connected directly or indirectly to the drive shaft 16. The value for the position of the drive shaft 16 is then formed from the signals of the virtual rotary encoder and auxiliary contact.

The control device 2, in particular the control unit 10 and/or the power section 11, is configured to control the motor 12 in an open-loop manner or in a closed-loop manner according to a feedback signal generated by the feedback system 4 on the basis of the value.

The control device 2, for example the control unit 10, uses the value for the position of the drive shaft 16 or actuating shaft 20 for position determination of the on-load tap changer 17. The control device 2, for example the control unit 10, controls the motor 12 in an open-loop and closed-loop manner so that it has a specified rotational speed according to the specifications.

When the on-load tap changer 17 is switched over or actuated, acceleration of the drive system 3, and in particular the motor 12, to a specified rotational speed, maintenance of this rotational speed thereby during the switchover and lowering of the rotational speed of the motor to 0 at the end of the switchover is continuously attempted. During the switchover or actuation of the on-load tap changer 17, the rotational speed of the motor 12 must not fall below a specified minimum value.

The actuating shaft 20 and the switching means (also referred to herein as a switch) 21 are mechanically connected or coupled to one another. The actuating shaft 20 may have cams which, from a certain point of the rotation of the actuating shaft 20, open and close, for example via a knee lever, the switching means 21, in particular vacuum interrupters. In this case, it is assumed that the energy required for actuating the switching means 21 is the same at all times. In other words, for actuating the switching means 21, a constant torque has to be applied at all times.

Since an ideal system is not involved, it is assumed that the motor 12 firstly makes the energy required for actuating the switching means 21 available in a delayed manner and the rotational speed of the motor 12 thus initially falls. The motor 12 then makes the energy available with a delay, whereby also the rotational speed increases.

Figure 2:
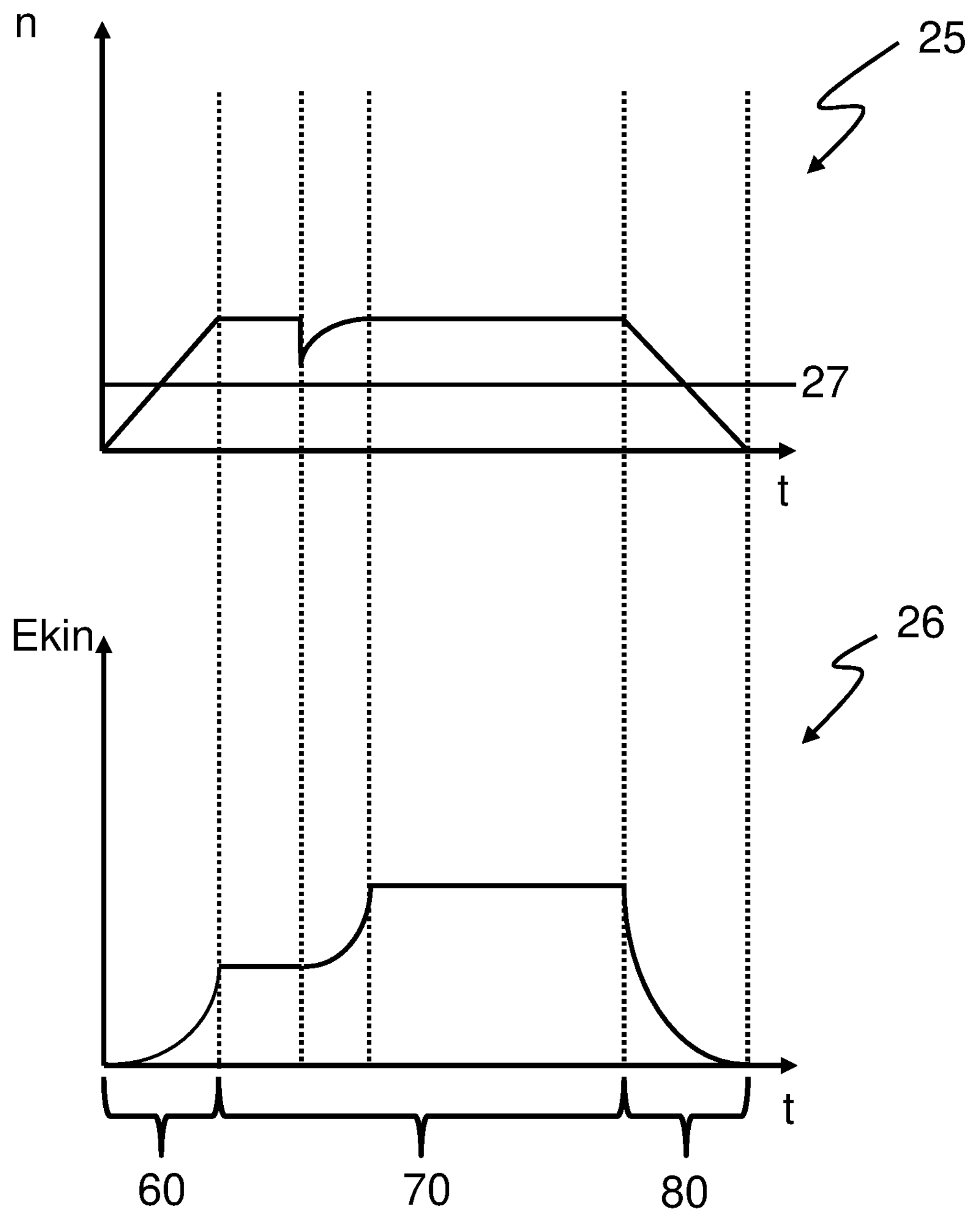
FIG. 2 shows a travel profile of a motor of a drive system of the switch unit in two diagrams.

FIG. 2 shows a possible travel profile of the motor 12 for a switchover or actuation of the switch unit 1, and in particular the division of the switchover into multiple steps in different diagrams 25, 26. For a better explanation, said diagrams are illustrated arranged one below the other. In the first diagram 25, the rotational speed n of the motor 12 is plotted against time. The actuating shaft 20 is accelerated via the motor 12 of the drive system 3. As can be seen here, in a first step 60, the rotational speed of the motor 12, over a certain period of time, increases linearly until a certain value, that is to say a certain rotational speed, is attained. In this case, the first step 60 of the switching method or of the switchover is involved. The second diagram 26, which is shown below the first diagram 25, illustrates the profile of the kinetic energy. The kinetic energy is formed from the rotational speed and the inertia of the actuating shaft 20 and the inertia of the switching means 21.

Here, too, the first step 60 of the switchover is illustrated with delimitation. While the motor 12 of the drive system 3 is accelerating the actuating shaft 20, the kinetic energy in the whole mechanical system of the switch unit 1 increases.

Then, in the second step 70, the actuation of the switching means 21 occurs. Advantageously, in addition to the energy from the motor 12, use is made of the kinetic energy of the actuating shaft 20 to actuate the switching means 21. In other words, the momentum of the mass of the actuating shaft 20 assists the motor 12 during the actuation of the switching means 21. The actuating shaft 20 is used as a store for kinetic energy. It can see in the second step 60 that, when the switching means 21 is actuated, the rotational speed of the motor 12 briefly decreases and then increases again to the specified value.

Through the actuation of the switching means 21, in particular when the Geneva wheels of the switching means 21 are actuated, from a certain point, their inertia is abruptly coupled to the inertia of the actuating shaft 20. Shifting of kinetic energy from actuating shaft 20 into the switching means 21 occurs. Since the total energy remains unchanged, the rotational speed of the actuating shaft necessarily has to decrease. Since, then, the inertia of the actuating shaft 20 and that of the switching means 21 has to be accelerated, so that the motor attains the specified rotational speed, there is also an increase in the kinetic energy. When the switching means 21 is actuated, it is particularly important that the rotational speed does not fall below a certain minimum value 27. A fall below the minimum value could result in the switching means 21 being actuated too slowly. Switching times will then not be adhered to, so that electric arcs in the switching means 21 would not be able to be extinguished or transition resistors would be subjected to load for too long.

Figure 3A:
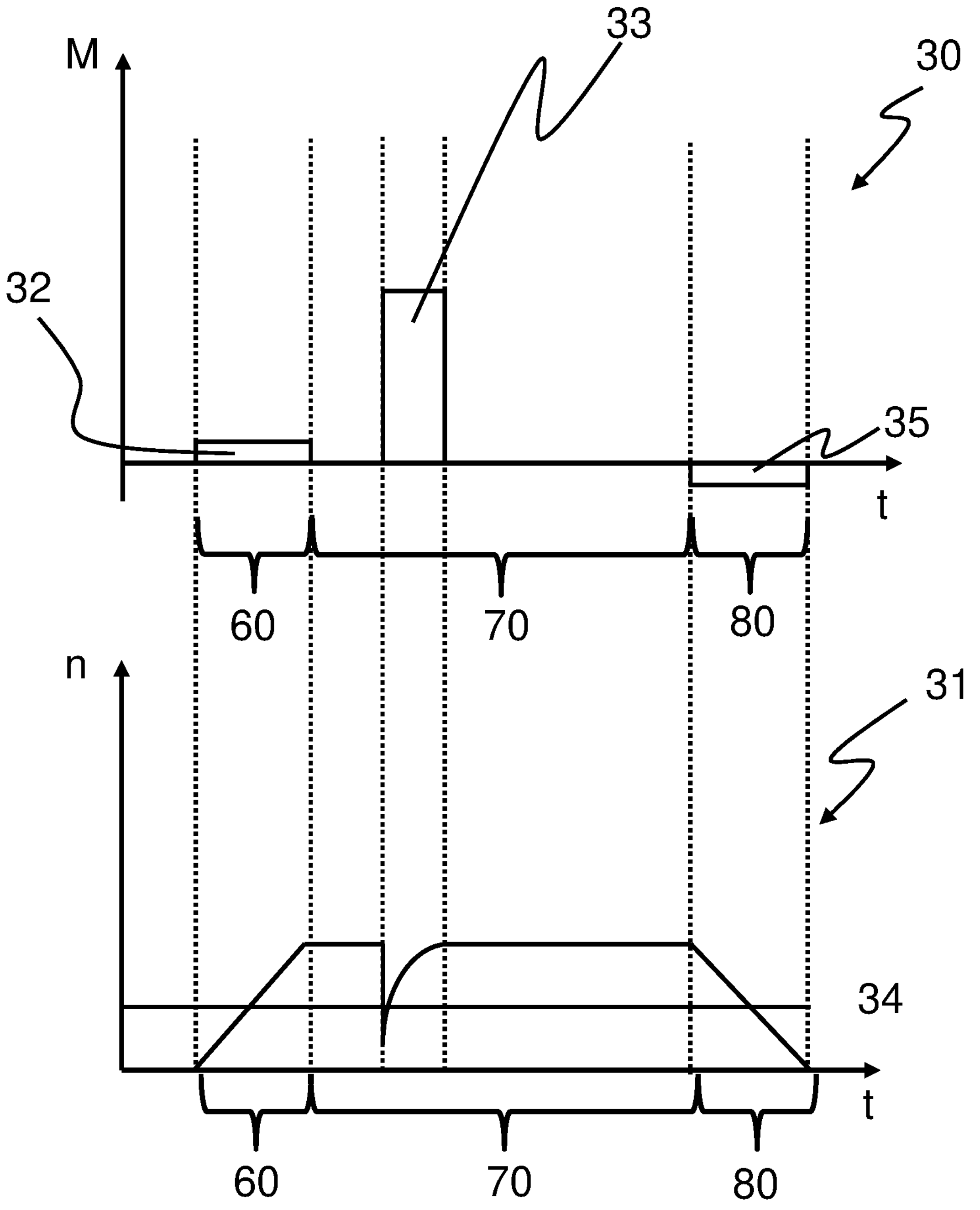
FIG. 3*a*, FIG. 3*b* and FIG. 3*c* show three travel profiles of drive systems with different actuating shaft by means of in each case two diagrams.
Figure 3B:
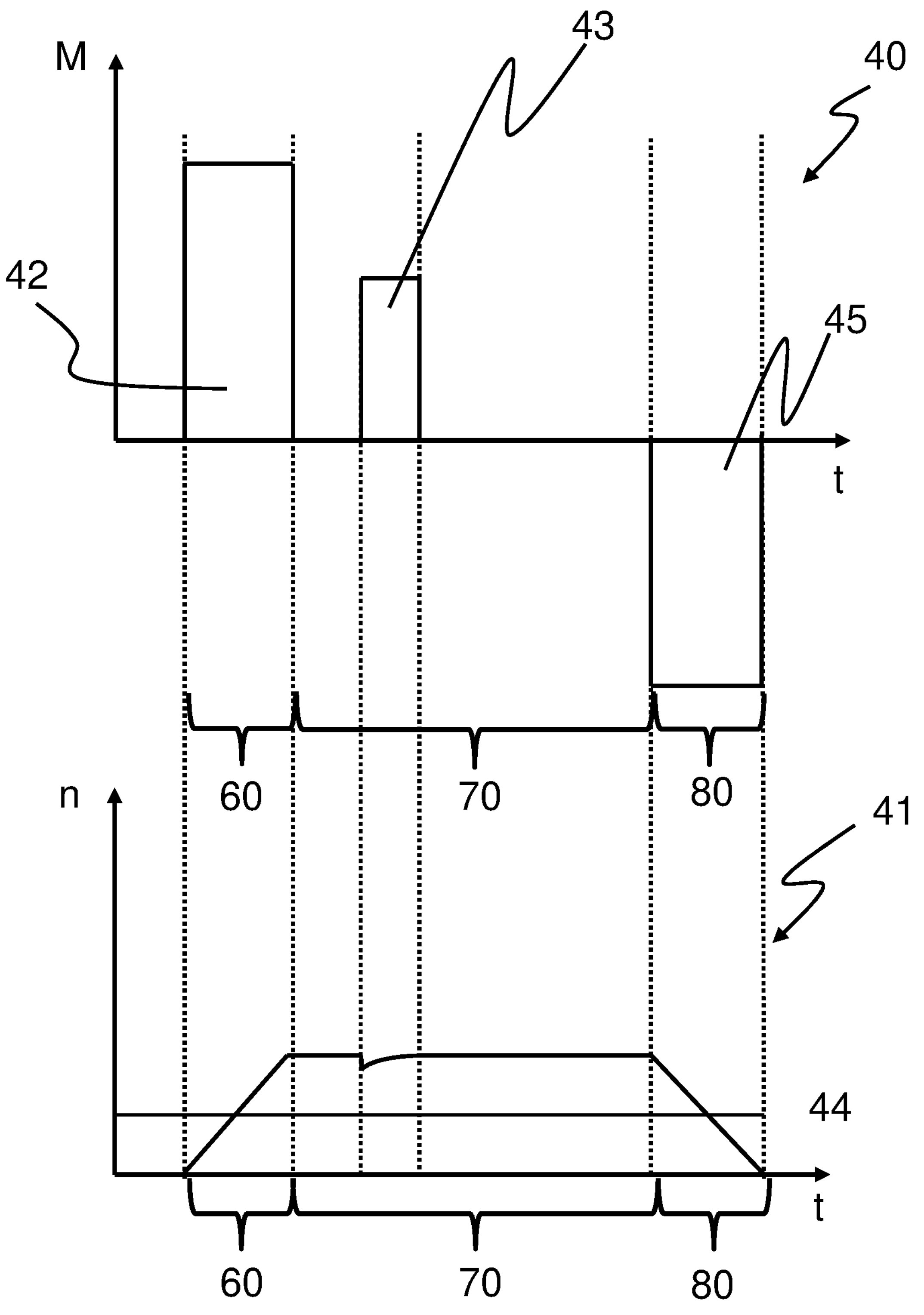
Figure 3C:
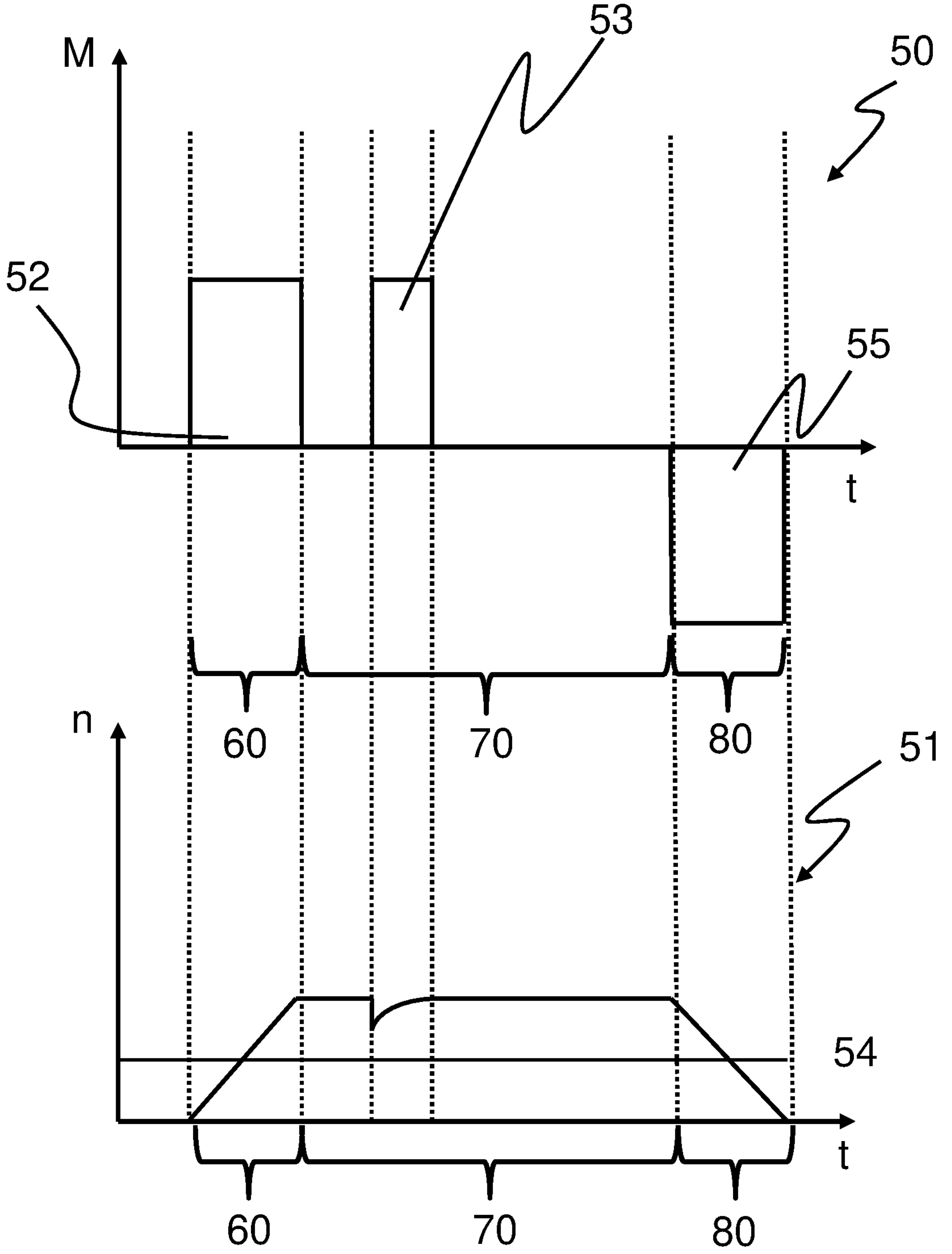

In FIGS. 3*a* to 3*c*, the combinations of three different actuating shafts 20 as store for kinetic energy and the motor 12 are described by means of three travel profiles. The first, upper diagram 30 in FIG. 3*a* shows the occurring torques that occur when the on-load tap changer 17 is actuated over a period of time. The first area 32 shows the required torque for the acceleration of the actuating shaft 20. The second area 33 shows the required torque for the actuation of the switching means 21. The third area 34 shows the required torque for the deceleration of the actuating shaft 20. In the diagram 31 below, the rotational-speed profile of the motor 12 is illustrated against time.

In this example, the inertia of the actuating shaft 20 is small. Therefore, it is necessary for a small torque to be applied to accelerate the actuating shaft 20. Only a small amount of kinetic energy is stored in the actuating shaft 20. Since this energy is significantly smaller than the work required for actuating the switching means 21, the rotational speed of the motor 12 falls considerably since the non-ideal drive system 3 requires a certain amount of time to introduce or refeed the lost energy back into the system. In other words, the energy removed from the system is very large in relation to the kinetic energy available prior to the actuation of the switching elements 21. In this case, the minimum value of the rotational speed 34 is fallen below, and this has an adverse effect on the switchover. In this respect, for example, switching times cannot be adhered to in the on-load tap changer 17.

The second pair of diagrams 40, 41 in FIG. 3*b* shows the travel profile of an embodiment of the switch unit 1 in which the inertia of the actuating shaft 20 is very large. Therefore, it is necessary for a large torque 42 to be applied to accelerate the actuating shaft 20. A very large amount of kinetic energy is stored in the actuating shaft 20. Since this energy is significantly greater than the work required for actuating the switching means 21, there is hardly any fall in the rotational speed of the motor as soon as the torque of the switching means 21 occurs. In other words, the energy removed from the system is very small in relation to the kinetic energy available prior to the actuation of the switching elements 21. In this case, the minimum value 44 of the rotational speed is not fallen below, and this has a positive effect on the switchover. However, in this case, a very powerful motor 12 is required to bring the actuating shaft 20 to the corresponding rotational speed n. Powerful motors make a drive system expensive and thus uneconomical. The third area 44 shows the required torque for the deceleration of the actuating shaft 20.

The third pair of diagrams 50, 51 in FIG. 3*c* shows a travel profile of an optimum embodiment of the switch unit 1 in which the inertia of the actuating shaft 20 together with the motor 12 have been matched to the torque 53 required when the switching means 20 is actuated. In this case, the mass of the actuating shaft 20 is just large enough that, when the switching means 21 is actuated, the rotational speed remains just above a minimum value and the torque 52 for the acceleration of the actuating shaft 20 does not become too large. A smaller, more suitable motor 12 can be selected.

In other words, the inertia of the actuating shaft 20 is selected to be of such a size that the torque 52 for accelerating and decelerating the actuating shaft 20, from the absolute value, is greater than or equal to the torque required by the switching means 21 during the switchover or actuation of the on-load tap changer 17.

Figure 4:
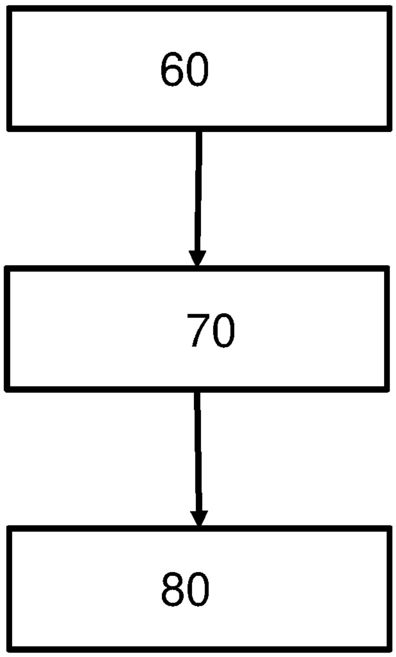
FIG. 4 shows a flow diagram for a switchover of a switch unit.

FIG. 4 shows a method for carrying out a switchover by means of a switch unit 1. In this case, in the first step 60, the actuating shaft 20 is accelerated by the motor 12 of the drive system 3. The actuating shaft 20 absorbs kinetic energy. In this case, the switching means 21 are not yet actuated. In a second step 70, the switching means 21 are actuated. In this case, use is made of the kinetic energy of the actuating shaft 20 and the energy of the drive system 3. In the third step 80, the actuating shaft 20 is decelerated by the drive system 3 braked.

Switchover is to be understood as meaning the actuation of the on-load tap changer. In this case, a switchover from one winding tap of a step transformer to an adjacent winding tap of the step transformer takes place.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A switch unit, the switch unit comprising:

an on-load tap changer comprising an actuating shaft that actuates a switch; and a drive system comprising a motor;

wherein:

the drive system is mechanically coupled to and is configured to actuate the on-load tap changer, and the drive system is configured such that, when the on-load tap changer is actuated, the drive system uses the actuating shaft as a store for kinetic energy in such a way that the actuating shaft is accelerated and the switch is actuated by the kinetic energy from the actuating shaft and additional energy provided by the motor.

2. The switch unit as claimed in claim 1, wherein;

the actuating shaft and the switch are mechanically coupled in such a way that the actuating shaft is configured to actuate the switch after a fixed angle of rotation.

3. The switch unit as claimed in claim 1, wherein:

the actuating shaft is configured to be revolved at least once, and the motor shaft is configured to be revolved multiple times, when the on-load tap changer is actuated.

4. The witch unit as claimed claim 1, wherein;

a torque for accelerating the actuating shaft is approximately or greater than a torque by which the switch is actuated.

5. The switch unit as claimed in claim 1, further comprising multiple switches, comprising the switch, which are in the form of vacuum interrupters or selector contacts.

6. A method for carrying out a switchover by a switch unit the switch unit comprising an on-load tap changer comprising an actuating shaft that actuates a switch; and a drive system comprising a motor, the drive system being mechanically coupled to and configured to actuate the on-load tap changer, and the drive system being configured such that, upon actuating the on-load tap changer, the drive system uses the actuating shaft as a store for kinetic energy in such a way that the actuating shaft is accelerated and the switch is actuated by the kinetic energy from the actuating shaft and additional energy provided by the motor, the method comprising:

in a first step, the actuating shaft is accelerated by the motor of the drive system, the actuating shaft absorbs kinetic energy, and no switch is actuated; and in a second step, the switch is actuated by the kinetic energy from the actuating shaft and the additional energy from the drive system.

7. The method for carrying out the switchover as claimed in claim 6, the method further comprising:

in a third step, the actuating shaft is decelerated by the motor of the drive system until the actuating brake is at a standstill.

* * * * *